US 9,105,215 B2

(12) United States Patent
Ichieda

(10) Patent No.: US 9,105,215 B2
(45) Date of Patent: Aug. 11, 2015

(54) IMAGE SIGNAL SUPPLY APPARATUS, IMAGE DISPLAY APPARATUS, AND CONTROL METHOD OF IMAGE SIGNAL SUPPLY APPARATUS

(75) Inventor: Hiroyuki Ichieda, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 260 days.

(21) Appl. No.: 12/693,697

(22) Filed: Jan. 26, 2010

(65) Prior Publication Data
US 2010/0188563 A1 Jul. 29, 2010

(30) Foreign Application Priority Data
Jan. 27, 2009 (JP) ................ 2009-015070

(51) Int. Cl.
H04N 5/222 (2006.01)
H04N 5/225 (2006.01)
G09G 5/00 (2006.01)
H04N 9/31 (2006.01)
G06F 3/14 (2006.01)

(52) U.S. Cl.
CPC ............. G09G 5/006 (2013.01); H04N 9/3102 (2013.01); H04N 9/3197 (2013.01); G06F 3/1438 (2013.01); G09G 2370/10 (2013.01)

(58) Field of Classification Search
CPC ........... H04N 1/00623; H04N 5/7408; H04N 1/00129; H04N 1/00286; H04N 5/222
USPC ............... 348/207.99, 239, 373, 744, 333.01; 353/63–67, 122
See application file for complete search history.

(56) References Cited

U.S. PATENT DOCUMENTS

| 5,764,385 | A  | * | 6/1998 | Ohyama ........................ 358/498 |
| 7,245,441 | B2 | * | 7/2007 | Wu et al. ........................ 359/676 |
| 7,929,050 | B2 | * | 4/2011 | Liang et al. .................... 348/373 |
| 7,980,708 | B2 | * | 7/2011 | Ishikawa et al. .............. 353/119 |
| 8,279,258 | B2 |   | 10/2012 | Ichieda |
| 2002/0024638 | A1 | * | 2/2002 | Hidari et al. ..................... 353/63 |
| 2003/0210229 | A1 |   | 11/2003 | Nishimura et al. |
| 2004/0174698 | A1 |   | 9/2004 | Nagashima et al. |
| 2004/0239816 | A1 |   | 12/2004 | Ando |
| 2005/0068419 | A1 | * | 3/2005 | Morichika ................. 348/207.1 |

(Continued)

FOREIGN PATENT DOCUMENTS

EP 1 942 486 A2 7/2008
JP A-2003-101818 4/2003

(Continued)

OTHER PUBLICATIONS

Extended European Search Report issued in European Patent Application No. 10151835.5 on Apr. 29, 2010.

(Continued)

Primary Examiner — Tuan Ho
Assistant Examiner — Selam Gebriel
(74) Attorney, Agent, or Firm — Oliff PLC

(57) ABSTRACT

An image signal supply apparatus which is connected to an image display apparatus including an input source switching unit and outputs an image signal as an input source to the image display apparatus, includes: a communication unit carrying out communication with the image display apparatus; and a switching instruction output unit outputting an instruction signal instructing to switch the input source to the image display apparatus via the communication unit.

19 Claims, 7 Drawing Sheets

(56) References Cited

U.S. PATENT DOCUMENTS

| | | | |
|---|---|---|---|
| 2005/0078200 A1* | 4/2005 | Morichika | 348/231.99 |
| 2005/0088528 A1* | 4/2005 | Sambongi et al. | 348/207.11 |
| 2005/0088543 A1* | 4/2005 | Yoshii | 348/239 |
| 2006/0082678 A1* | 4/2006 | Shih et al. | 348/370 |
| 2006/0146291 A1* | 7/2006 | Olson et al. | 353/30 |
| 2006/0171038 A1* | 8/2006 | Hung et al. | 359/691 |
| 2006/0203133 A1* | 9/2006 | Fujiwara | 348/744 |
| 2006/0228020 A1* | 10/2006 | Sakai | 382/162 |
| 2006/0279804 A1* | 12/2006 | Ishikawa et al. | 358/474 |
| 2007/0024944 A1* | 2/2007 | Gupta et al. | 359/237 |
| 2007/0165193 A1* | 7/2007 | Kubo et al. | 353/85 |
| 2007/0241990 A1* | 10/2007 | Smith et al. | 345/5 |
| 2008/0062298 A1* | 3/2008 | Yen et al. | 348/333.07 |
| 2009/0002548 A1* | 1/2009 | Liang et al. | 348/373 |
| 2009/0128715 A1* | 5/2009 | Makino | 348/744 |
| 2009/0153751 A1* | 6/2009 | Asakura et al. | 348/744 |
| 2009/0167918 A1* | 7/2009 | Ueda et al. | 348/333.01 |
| 2011/0099493 A1* | 4/2011 | Yu et al. | 715/764 |
| 2013/0021223 A1 | 1/2013 | Ichieda | |

FOREIGN PATENT DOCUMENTS

| | | |
|---|---|---|
| JP | A-2004-120374 | 4/2004 |
| JP | A-2008-077380 | 4/2008 |
| TW | A-2006-39565 | 11/2006 |
| TW | A-2007-04165 | 1/2007 |
| WO | WO 2009/001879 A1 | 12/2008 |

OTHER PUBLICATIONS

Jacobson, Julie "Panasonic Demos Control over HDMI", CE Pro Magazine Article from CE Pro, Jan. 17, 2007, http://www.cepro.com/article/panasonic_demos_control_over_hdmi/ Non-patent reference.

\* cited by examiner

IMAGE SIGNAL SUPPLY APPARATUS, IMAGE DISPLAY APPARATUS, AND CONTROL METHOD OF IMAGE SIGNAL SUPPLY APPARATUS

CROSS-REFERENCE

The entire disclosure of Japanese Patent Application No. 2009-015070 filed Jan. 27, 2009 is expressly incorporated by reference herein.

BACKGROUND

1. Technical Field

The present invention relates to an image signal supply apparatus, an image display apparatus connected to the image signal supply apparatus, and a control method of image signal supply apparatus.

2. Related Art

In presentations, generally, a document camera is connected to a projector and an image imaged by the document camera is projected by the projector. As such an image display system, a configuration has been suggested in which the color tones or brightness of an image projected by the projector is controlled by the document camera (JP-A-2003-101818).

However, in the related art, user operability is not excellent for the following reasons. In general, a projector includes plural input interfaces and an image from a document camera cannot be immediately displayed when the document camera is connected to the projector which is being connected to an input device other than the document camera to display an image. Accordingly, the user needs to switch an input source to the document camera by using a projector remote controller or operating a panel switch disposed in the projector; however, at this time, the user has to move to the place of the projector or the place in which the projector remote controller is located. Accordingly, the operability is not good.

SUMMARY

An advantage of some aspects of the invention is to improve the operability by facilitating the switching of input sources in a projector.

The invention can be embodied in the following forms or application examples.

APPLICATION EXAMPLE 1

Application Example 1 of the invention is directed to an image signal supply apparatus which is connected to an image display apparatus including an input source switching unit and outputs an image signal as an input source to the image display apparatus, the image signal supply apparatus including: a communication unit carrying out communication with the image display apparatus; and a switching instruction output unit outputting an instruction signal instructing to switch the input source to the image display apparatus via the communication unit.

In the image signal supply apparatus according to Application Example 1, by causing the switching instruction output unit to output the instruction signal instructing to switch the input source to the image display apparatus via the communication unit, the input source of an image to be displayed by the image display apparatus can be switched by the use of the image signal supply apparatus. Therefore, with the image signal supply apparatus according to Application Example 1, since a user need not move to a place in which the image display apparatus or the remote controller of the image display apparatus is located, convenience is good.

APPLICATION EXAMPLE 2

Application Example 2 of the invention is directed to the image signal supply apparatus according to Application Example 1, further including an imaging unit imaging an image of a subject.

The image signal supply apparatus according to Application Example 2 can be used as a camera imaging an image of a subject.

APPLICATION EXAMPLE 3

Application Example 3 of the invention is directed to the image signal supply apparatus according to Application Example 1 or 2, further including a switch receiving a predetermined operation, wherein the switching instruction output unit outputs the instruction signal on the basis of the predetermined operation performed on the switch.

In the image signal supply apparatus according to Application Example 3, simply by the user operating a switch, it is possible to output the instruction signal instructing to switch the input source to the image display apparatus. Accordingly, the operability thereof is excellent.

APPLICATION EXAMPLE 4

Application Example 4 of the invention is directed to the image signal supply apparatus according to Application Example 2, further including: a foldable arm holding the imaging unit; and an arm unfolding sensor sensing that the foldable arm is unfolded, wherein the switching instruction output unit outputs the instruction signal when the arm unfolding sensor senses that the foldable arm is unfolded.

In the image signal supply apparatus according to Application Example 4, only by unfolding the arm holding the imaging unit when the user takes an image with the image signal supply apparatus, it is possible to output the instruction signal instructing to switch the input source to the image display apparatus. Accordingly, the operability thereof is more excellent.

APPLICATION EXAMPLE 5

Application Example 5 of the invention is directed to the image signal supply apparatus according to any one of Application Examples 1 to 4, wherein the communication unit carries out communication conforming to a USB standard.

In the image signal supply apparatus according to Application Example 5, communication can be carried out using a USE which is a general-purpose interface.

APPLICATION EXAMPLE 6

Application Example 6 of the invention is directed to an image display apparatus connected to an image signal supply apparatus, the image display apparatus including: a communication unit carrying out communication with the image signal supply apparatus; an input source switching unit switching an input source of an image to be displayed; and a switching controller activating the input source switching unit when an instruction signal for instructing to switch the input source is received from the image signal supply apparatus via the communication unit.

APPLICATION EXAMPLE 7

Application Example 7 of the invention is directed to an image display system including an image display apparatus and an image signal supply apparatus connected to the image display apparatus, wherein the image display apparatus includes an input source switching unit switching an input source of an image to be displayed, and wherein the image signal supply apparatus includes: a communication unit carrying out communication with the image display apparatus; and a switching instruction output unit outputting an instruction signal instructing to switch the input source to the image display apparatus via the communication unit.

In the image display apparatus according to Application Example 6 and the image display system according to Application Example 7, the input source of an image to be displayed can be switched by the use of the image signal supply apparatus. Accordingly, in the image display apparatus according to Application Example 6 and the image display system according to Application Example 7, the user of the image signal supply apparatus need not move to the place in which the image display apparatus or the remote controller of the image display apparatus is located so as to switch the input source of the image display apparatus, and thus the operability thereof is excellent.

The invention can be modified in various forms and can be embodied in the forms of a method for embodying the units of the image signal supply apparatus or the image display apparatus, a computer program for embodying the units, a recording medium having recorded thereon the computer program, and the computer program.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
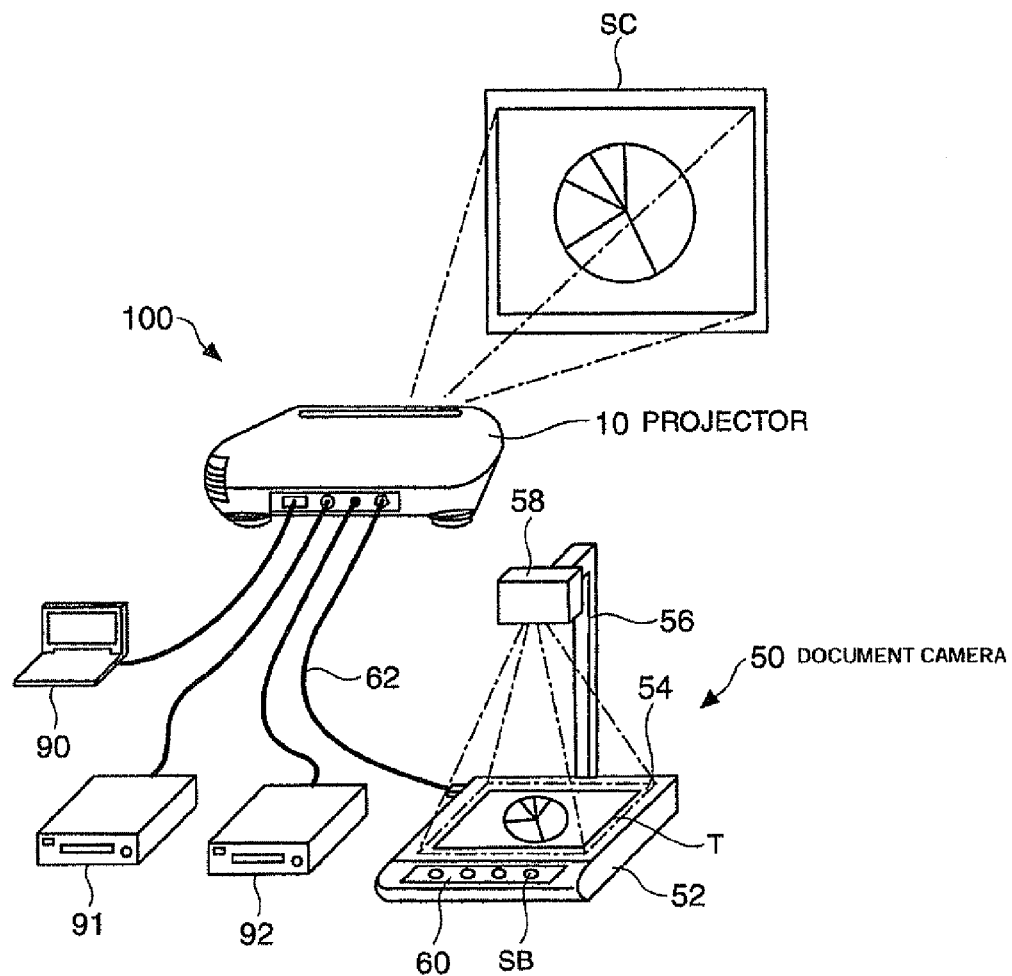
FIG. 1 is a diagram schematically illustrating a configuration of a projector system according to an embodiment of the invention.

Hereinafter, exemplary embodiments of the invention will be described with reference to the accompanying drawings.
1. Hardware Configuration FIG. 1 is a diagram schematically illustrating a projector system according to an embodiment of the invention. As shown in the drawing, the projector system 100 includes a projector 10 and four image input apparatuses connected to the projector 10, such as a document camera 50, a personal computer 90, a video tape recorder (VTR) 91, and a DVD player 92. These image input apparatuses provide input sources of images to the projector 10. Here, the image may be any of a still image and a moving image (that is, video). The document camera 50 acquires an image. The projector 10 selects a desired input source from the input sources and displays (projects) an image on a screen SC on the basis of the selected input source.

The document camera 50 includes a base member 52, a mounting plane 54, an arm 56, a camera head 58, and an operation panel 60. The mounting plane 54 is disposed on the base member 52 and a subject T such as a sheet of paper having characters or figures drawn thereon and a stereoscopic object is mounted thereon. The arm 56 holds the camera head 58. The camera head 58 includes a lens, an LED, and a photoelectric conversion device such as a CCD and images an image of the subject T mounted on the mounting plane 54. The operation panel 60 includes plural buttons (button type switches) and allows a user to input an operating instruction to the document camera 50.

The arm 56 may extend upward from the base member 52 and then be fixed, or may foldably rotate toward the base member 52. By constructing the arm so as to be foldable, the document camera 50 can be compactly arranged. By unfolding the folded arm 56, a subject can be imaged.

The document camera 50 having the above-mentioned configuration images an image of the subject T mounted on the mounting plane 54 and outputs an image signal indicating the imaged image to the projector 10. The projector 10 and the document camera 50 are USB-connected to each other with a USB cable 62.

Figure 2:
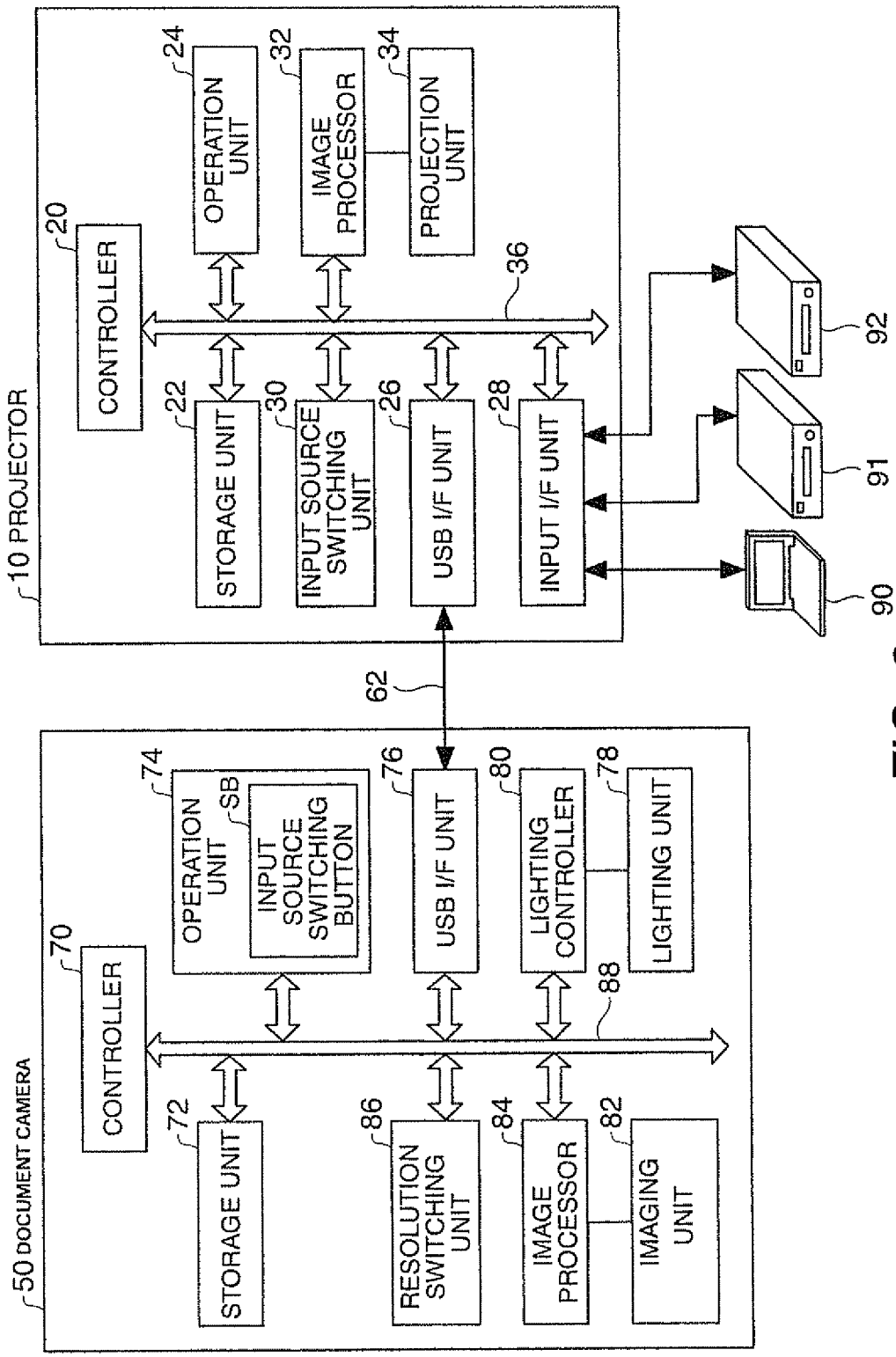
FIG. 2 is a diagram illustrating an internal configuration of a projector and a document camera.

FIG. 2 is a diagram illustrating the internal configuration of the projector 10 and the document camera 50. As shown in the drawing, the projector 10 includes a controller 20, a storage unit 22, an operation unit 24, a USB interface unit 26, an input interface unit 28, an input source switching unit 30, an image processor 32, and a projection unit 34. Reference numeral 36 represents a bus and connects the controller 20 to the units 22 to 32 other than the projection unit 34.

The controller 20 is constructed by a CPU or the like and operates in accordance with computer programs stored in the storage unit 22 to control the units 22 to 32. The storage unit 22 stores image data or various computer programs. A known USB module, a USB class driver, an image display program, and a program for a switching process to be described later are stored as the computer programs. The operation unit 24 serves to input an operation instruction from a user to the projector 10 and includes an operation panel (not shown) and a remote controller receiver (not shown). The operation panel and the remote controller are provided with an input source switching button (not shown) for switching an input source of an image to be displayed by the projector 10.

The USB interface unit 26 is an interface used to transfer control data or image data with an external device on the basis of a USB (Universal Serial Bus) standard. In this embodiment, the document camera 50 is connected to the USB interface unit 26.

The input interface unit 28 is an interface used to transfer control data and image data with an external device other than a USB, and includes an RGB interface, a video interface, and an S-video interface. The RGB interface is connected to the personal computer 90, the video interface is connected to the VTR 91, and the S-video interface is connected to the DVD player 92.

The input source switching unit 30 switches the input source of the image to be displayed by the projector 10 by selecting one interface out of the USB interface unit 26 and the interfaces included in the input interface unit 28.

Figure 8:
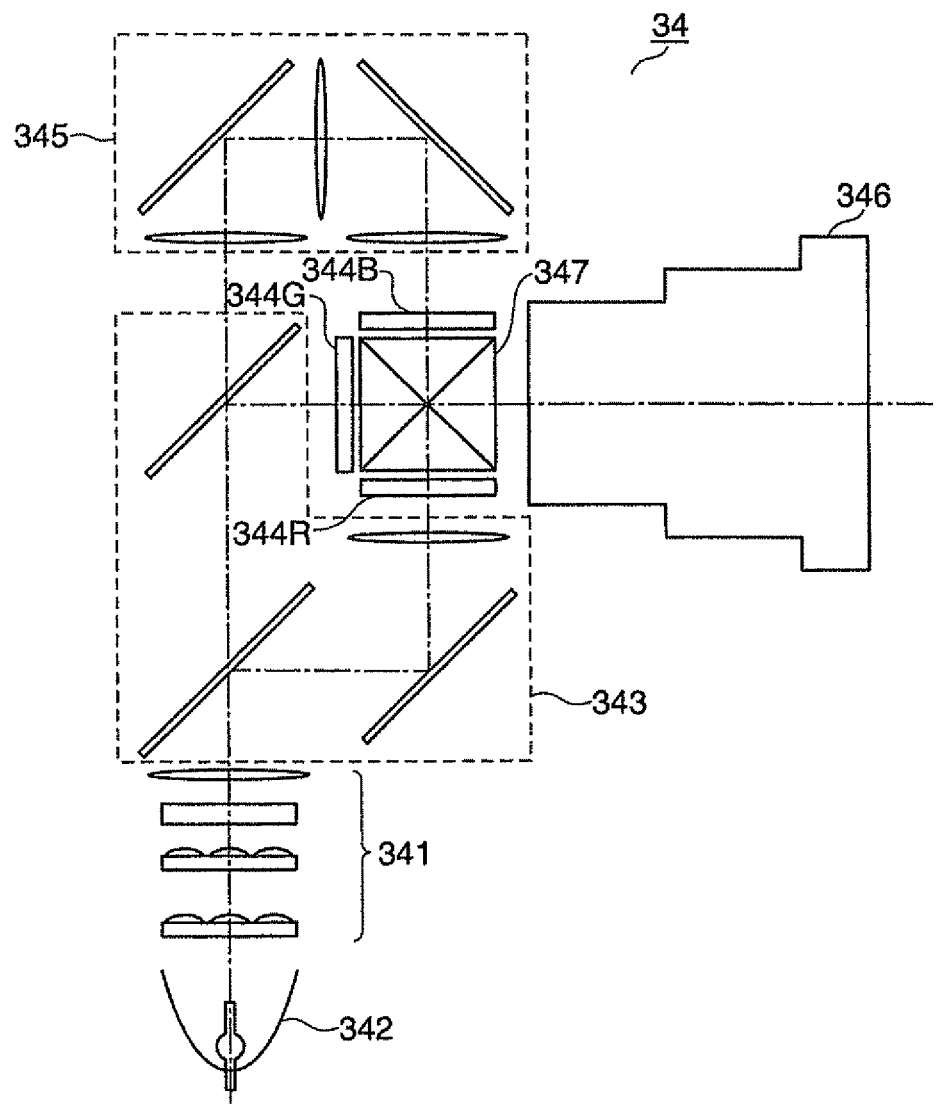
FIG. 8 is a diagram illustrating an internal configuration of a projection unit of the projector.

The image processor 32 generates display image data for image display on the basis of the image data or video data input from the interface selected by the input source switching unit 30. As shown in FIG. 8, the projection unit 34 includes a light source 342, light modulators 344 (344R, 344G, and 344B), a projection lens 346, a lighting operating system 341, a color separating optical system 343, a relay optical system 345, and a synthesis optical system 347. The projector 10 according to this embodiment includes a transmissive liquid crystal panel as the light modulators 344. White light emitted from the light source 342 is separated into a red beam, a green beam, and a blue beam while passing through the lighting optical system 341, the color separating optical system 343, and the relay optical system 345, and the separated beams are modulated by the light modulators 344 on the basis of the display image data generated by the image processor 32 and are incident on the synthesis optical system 347. The color image beams modulated by the light modulators 344 are synthesized by the synthesis optical system 347 and the synthesized image light is projected from the projection lens 346. The synthesis optical system 347 can be constructed by a dichroic prism or the like.

The document camera 50 includes a controller 70, a storage unit 72, an operation unit 74, a USE interface unit 76, a lighting unit 78, a lighting controller 80, an imaging unit 82, an image processor 84, and a resolution switching unit 86. Reference numeral 88 represents a bus and connects the controller 70 to the units 72 to 76, 80, 84, and 86 other than the lighting unit 78 and the imaging unit 82.

The controller 70 is constructed by a CPU or a DSP, and operates in accordance with computer programs stored in the storage unit 72 so as to control the units 70 to 86 included in the document camera 50. The storage unit 72 stores image data or various computer programs. A known USB module, a USB class driver, and a program for performing a switching instruction issuing process are stored as the computer programs.

The operation unit 74 serves to input an operation instruction from a user to the document camera and includes an operation panel 60 (see FIG. 1) disposed in the document camera 50. The operation unit includes an input source switching button SE. The input source switching button SB is disposed on the operation panel 60 shown in FIG. 1 and the function thereof will be described in detail later.

The USB interface unit 76 is an interface used to transfer control data or image data with an external device on the basis of the USB standard. In this embodiment, the USB interface unit 76 is connected to the USB interface unit 26 of the projector 10. The USB interface unit 76 corresponds to the "communication unit" described in the claims.

The lighting unit 78 includes a light source such as an LED emitting light to the subject T. The lighting controller 80 controls the turning-on and turning-off of the lighting unit 78. The imaging unit 82 includes a photoelectric conversion device such as a CCD and a driving unit controlling an AE (automatic exposure)/AF (automatic focus) control operation. The imaging unit 82 is built in the camera head 58 (see FIG. 1). The image processor 84 performs an image process such as white balancing on the image signal corresponding to the image taken by the imaging unit 82. The resolution switching unit 86 switches the resolution of the image taken by the imaging unit 82 into a resolution requested by the projector 10. The request of the projector 10 is sent from the projector 10 via the USB I/F unit 76.

The projector 10 and the document camera 50 having the above-mentioned configurations operate as follows to display an image of the subject T (see FIG. 1). That is, when the document camera 50 and the projector 10 are connected to each other with the USB cable 62, the projector 10 establishes a connection to the USB I/F unit 76 of the document camera 50 via the USB I/F unit 26.

Subsequently, when the operation unit 74 of the document camera 50 is operated, the controller 70 controls the lighting controller 80, the image processor 84, and the resolution switching unit 86 to take an image of the subject T mounted on the mounting plane 54 (see FIG. 1), and temporarily stores the image signal acquired by the imaging unit 82 in the storage unit 72. Thereafter, the controller 70 transmits the image signal stored in the storage unit 72 to the projector 10 via the USB I/F unit 76.

In the projector 10, the controller 20 receives the image signal transmitted from the document camera 50 via the USB I/F unit 26 and controls the image processor 32 to generate the display image data on the basis of the received image signal. As a result, a projection beam modulated on the basis of the display image data is projected by the projection unit 34. As a result, the image of the subject T is displayed on the screen SC (see FIG. 1).

As described above, the projector 10 includes various input sources in addition to the document camera 50. When a user operates the input source switching button (not shown) included in the operation unit 24, the controller 20 of the projector 10 activates the input source switching unit 30 to select one interface out of the USB interface unit 26 and the interfaces of the input interface unit 28, whereby the input source of an image to be displayed by the projector 10 is switched.

In this embodiment, as described above, the operation unit 74 of the document camera 50 includes the input source switching button SB. When the input source switching button SB is operated by the user, the input source of the image to be displayed by the projector 10 is switched similarly. Operations of the document camera 50 and the projector 10 when the input source switching button SB is pushed will be described now in detail.

2. Software Configuration

Figure 3:
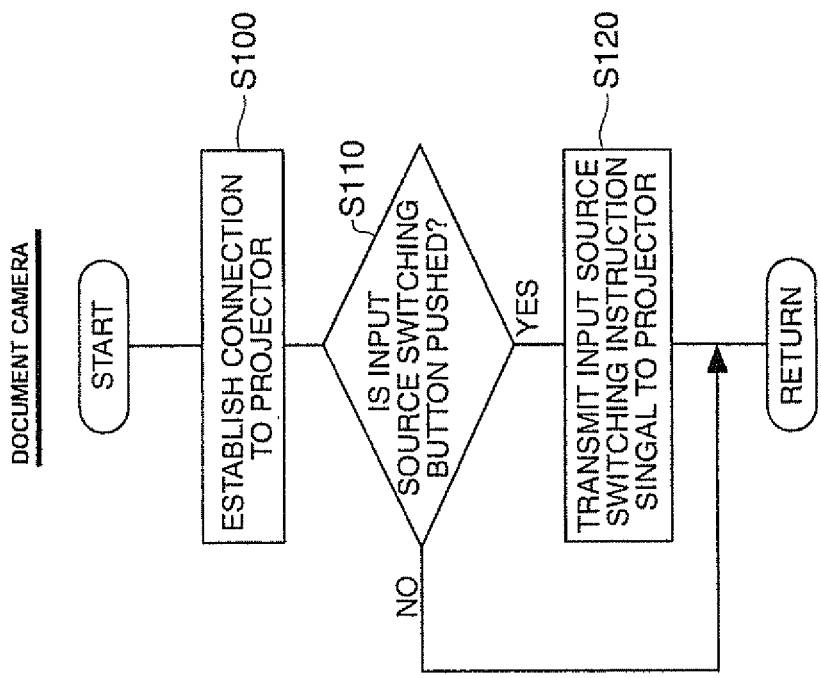
FIG. 3 is a flowchart illustrating a switching instruction issuing process performed by a controller of the document camera.

FIG. 3 is a flowchart illustrating a switching instruction issuing process performed by the controller 70 of the document camera 50. The switching instruction issuing process is repeatedly performed every predetermined time. First, when the document camera 50 and the projector 100 are electrically connected to each other with the USB cable 62, the projector 10 detects the document camera 50 and requests the document camera to transmit descriptor information. In response to this request, the document camera 50 transmits descriptor information to the projector 10, whereby a USB connection is established between the document camera 50 and the projector 10 (step S100). In this embodiment, the projector 10 is called "host" and the document camera 50 is called "device". The "host" and the "device" are defined in the USB protocol. The controller 70 of the document camera 50 determines whether the input source switching button SB disposed in the operation panel 60 is pushed (step S110). When it is determined that the input source switching button SB is pushed, the controller 70 transmits an instruction signal (hereinafter, referred to as "input source switching instruction signal") instructing to switch the input source to the projector 10 via the USB I/F unit 76 (step S120). Specifically, the document camera 50 transmits button IDs of various buttons and events of pushing and releasing the buttons to the projector 10 as the input source switching instruction signal.

The input source switching instruction signal is transmitted from the USB I/F unit 76 under the "control transmission" or the "interrupt transmission" of the USB communication control. That is, by temporarily storing data representing that the input source switching button SB is pushed in the storage unit 72 and receiving the data from the projector 10 via the USB I/F unit 26, the transmission of the input source switching instruction signal is carried out. In other words, the data representing that the input source switching button SB is pushed is transmitted as the input source switching instruction signal.

The controller 70 and the process of step S120 performed by the controller 70 correspond to the "switching instruction output unit" described in the claims. After the process of step S120 is performed, the switching instruction issuing process is temporarily ended by "return". On the other hand, when it is determined in step S110 that the input source switching button SB is not pushed, the switching instruction issuing process is ended temporarily by "return".

Figure 4:
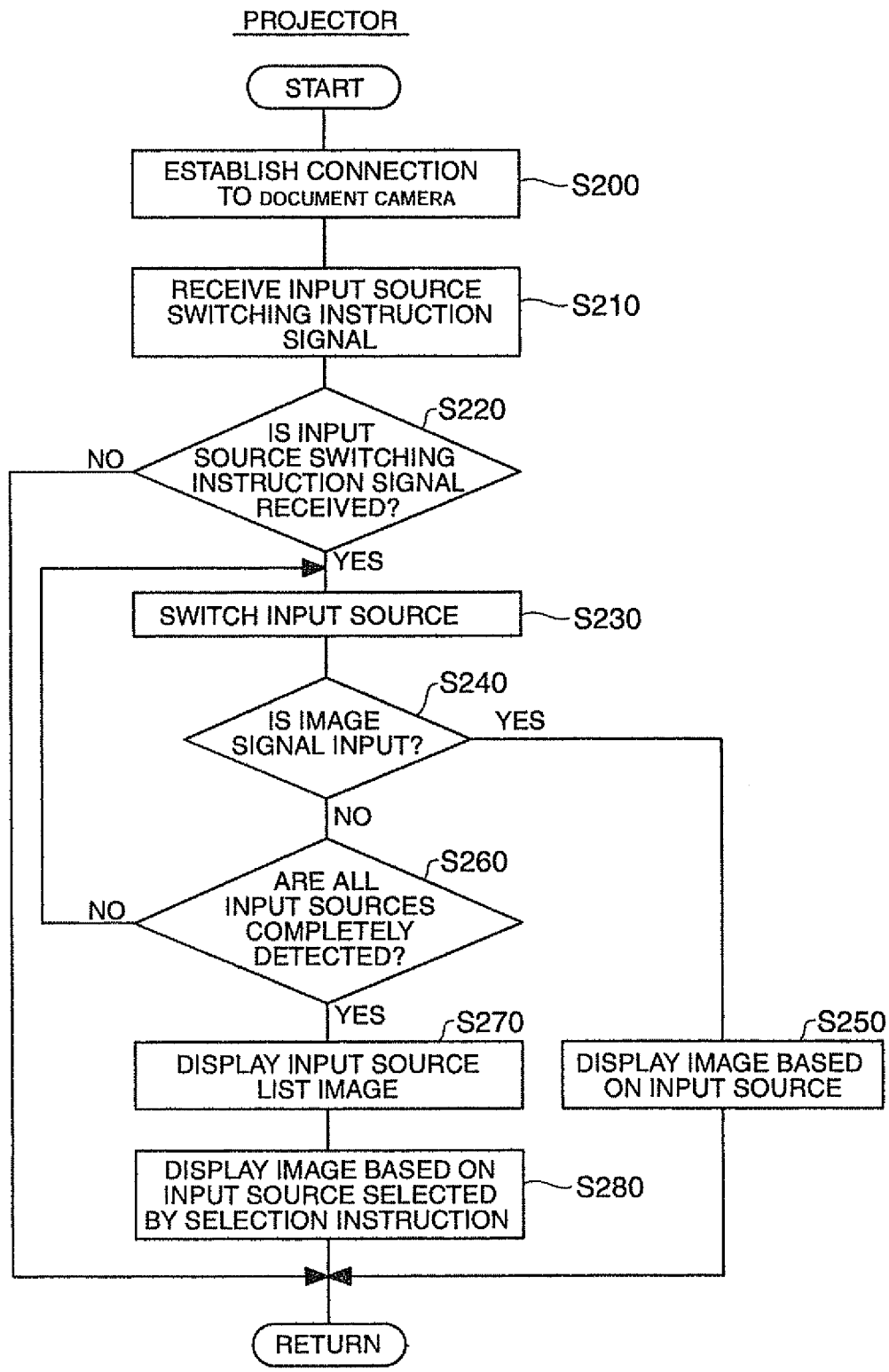
FIG. 4 is a flowchart illustrating a switching process performed by a controller of the projector.

FIG. 4 is a flowchart illustrating a switching process performed by the controller 20 of the projector 10. The switching process is repeatedly performed every predetermined time. First, the projector 10 as the "host" establishes a connection to the document camera 50 as the "device" (step S200). Subsequently, the controller 20 of the projector 10 performs a process of receiving the input source switching instruction signal sent from the document camera 50 (step S210). Here, when the input source switching instruction signal is not sent from the document camera 50 and there is a failure to receive the signal, a negative determination is made in step S220, that is, it is determined that the input source switching instruction signal is not received, and the switching process is ended by "return".

On the other hand, when the input source switching instruction signal is received and it is determined in step S220 that the input source switching instruction signal exists, the controller 20 activates the input source switching unit 30 to perform the input source switching process of switching the displayed input source to the next one (step S230).

In the projector 10, as described above, plural input sources can be selected and the input sources have priority. For example, the priority has an order of "computer"->"video"->"S-video"->"camera". Here, the "computer" represents the personal computer 90, the "video" represents the VTR 91, the "S-video" represents the DVD player 92, and the "camera" represents the document camera 50. The input source switching unit 30 performs a process of switching the input source to the next one.

Thereafter, the controller 20 determines whether the image signal is input from the input source switched in step S230 (step S240). Here, when it is determined that the image signal is input, the controller 20 activates the image processor 32 to perform an image display based on the input source (step S250).

On the other hand, when it is determined in step S240 that the image signal is not input from the input source, the controller 20 determines whether all the input sources other than the presently-displayed input source are completely detected in step S260. Here, when it is determined that all the input sources are not completely detected, the input source is switched to the next one again in step S230.

Figure 5:
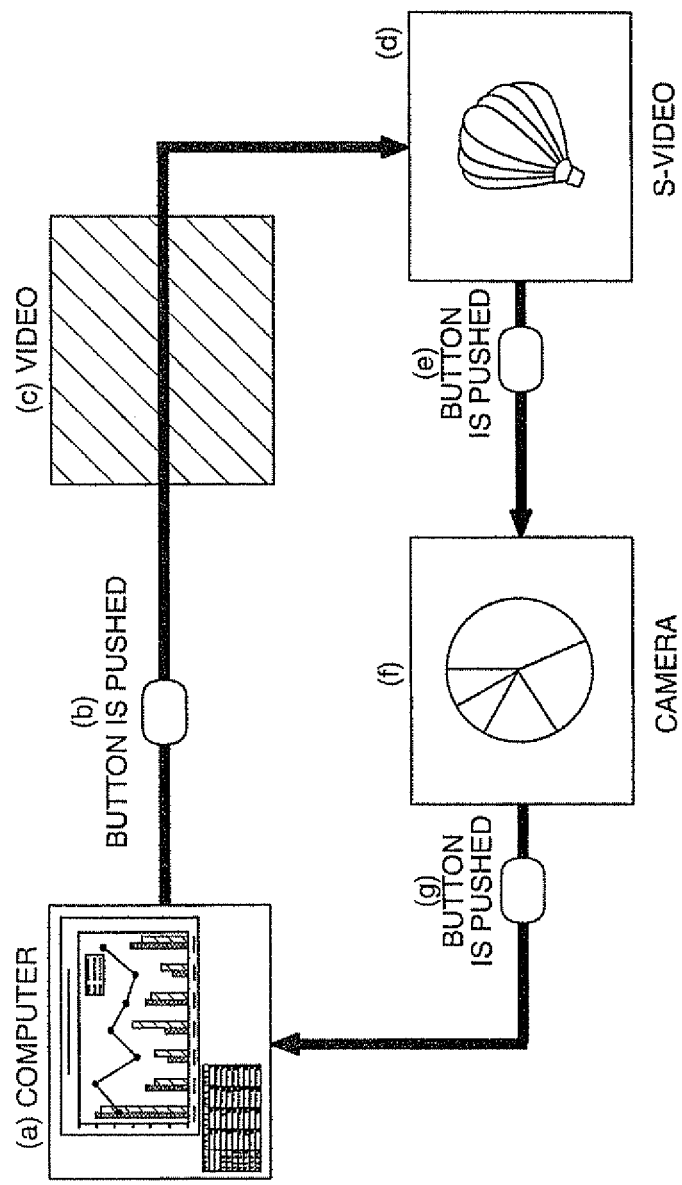
FIG. 5 is a diagram illustrating an example of the switching of an input source which is performed in the repeated processes of steps S230 to S260.

FIG. 5 is a diagram illustrating an example of the switching of the input source which is performed in the repeated processes of steps S230 to S260. When an image based on the input source of the "computer" is displayed as shown in (a) of the drawing and the input source switching button SB is pushed in this state as shown in (b) of the drawing, the input source is switched to the next "video" (step S230) as shown in (c) of the drawing. However, when an image signal is not input from the VTR 91 as the "video" (NO in step S240), the input source is switched to the next "S-video" (step S230) as shown in (d) of the drawing. Here, when an image signal is input from the DVD player 92 as the "S-video" (Yes in step S240), an image based on the DVD player 92 is displayed (step S250).

As shown in (e) of FIG. 5, when the input source switching button SB is pushed once more, the input source is switched to the next "camera". When an image signal is input from the document camera 50 as the "camera", an image based on the document camera 50 is displayed (step S250) as shown in (f) of the drawing. When the input source switching button SB is pushed once more as shown in (g) of the drawing, the input source is switched to the "computer" having the higher priority. When an image signal is input from the personal computer 90 as the "computer", an image based on the personal computer 90 is displayed (step S250) as shown in (a) of the drawing.

Referring to FIG. 4 again, when it is determined in step S260 that all the input sources other than the presently-displayed input source are completely detected, the controller 20 performs a process of displaying an input source list picture (step S270). When it is determined that all the input sources are detected, only the presently-displayed image signal is input to the projector 10 and thus the input source list picture is displayed on the screen SC, whereby the user is prompted to perform an operation to be described later.

Figure 6:
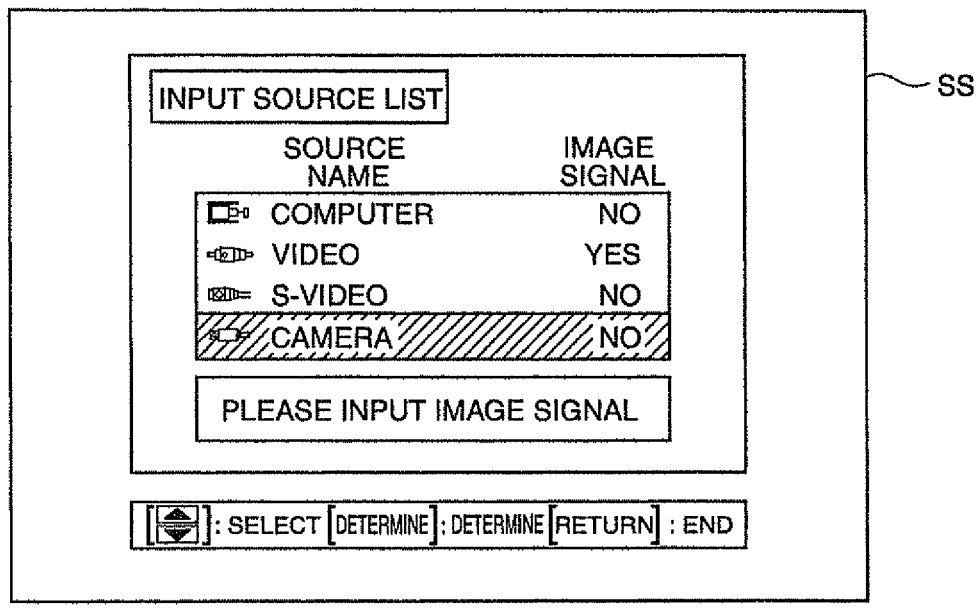
FIG. 6 is a diagram illustrating an example of an input source list picture.

FIG. 6 is a diagram illustrating an example of the input source list picture SS. As shown in the drawing, all source names of the image input devices connected to the projector 10 are displayed as a list in the input source list picture SS. In each of the source names, presence or absence of input of the image signal is shown. The source names can be selected by causing the user to operate the document camera 50. That is, the user selects a desired source out of the plural source names by operating the operation panel 60. This selecting instruction is sent from the document camera 50 to the projector 10.

Referring to FIG. 4 again, in step S280 subsequent to step S270, the controller 20 receives the selecting instruction from the document camera 50 and displays the image based on the selected input source. As a result, the input source of the source name selected from the input source list picture SS by the user is displayed on the screen SC. Particularly, when the selected input source is the document camera 50, the image data is acquired by the document camera 50 and the image data of the document camera 50 is displayed. When the selecting instruction is not sent from the document camera 50 for a predetermined time, the display of the input source list picture SS is ended (not displayed).

After the process of step S280 or the process of step S250 is performed, the switching process is temporarily ended by "return".

3. Operations and Advantages

In the projector system 100 according to this embodiment having the above-mentioned configuration, it is possible to switch the input source displayed by the projector 10 by pushing the input source switching button SB of the document camera 50. Accordingly, a user can switch the displayed input source without moving to a place in which the projector or the remote controller is located. Particularly, it is possible to switch the input source to the document camera 50 by pushing the input source switching button SB the necessary number of times. Accordingly, it is possible to improve the user operability.

In this embodiment, by switching the displayed input source one by one whenever the input source switching button SB of the document camera 50 is pushed, it is possible to allow the user to sequentially view the switched input source. Accordingly, the user does not make a mistake of erroneously switching the input source. Incidentally, the user can switch the input source from the document camera 50 to an input source other than the document camera.

In this embodiment, the input source from which the image signal is not input is skipped even when the input source switching button SB is pushed. Accordingly, a desired image can be displayed rapidly. When only the presently-projected image signal is input or when no image signal is input, it is possible to select the input source by the use of the input source list picture.

4. MODIFIED EXAMPLES

The invention is not limited to the above-mentioned embodiment or the modified examples thereof, but may be modified in various forms without departing from the spirit and scope of the invention. For example, the following modified examples can be employed.

(1) In the above-mentioned embodiment, when the input source switching button SB is pushed and only the presently-projected (displayed) image signal is input, the input source list picture is displayed. However, when the input source switching button SB is pushed, the input source list picture may be displayed regardless of the input of the image signal. According to this configuration, it is possible to rapidly select a desired input source.

Figure 7:
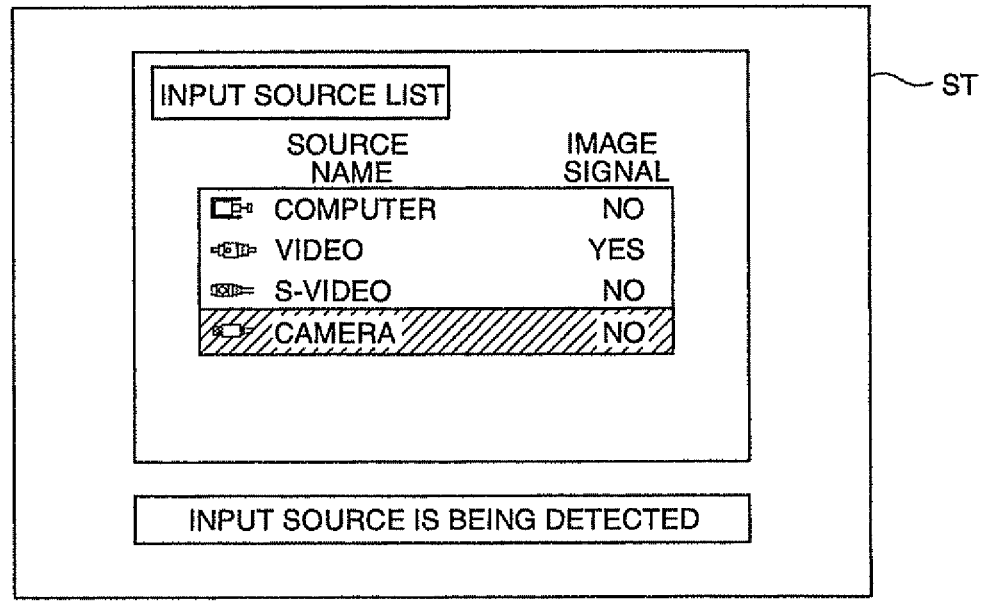
FIG. 7 is a diagram illustrating an example of an input source detecting picture.

(2) In the above-mentioned embodiment, the displayed input source can be sequentially switched to the input sources other than the document camera by pushing the input source switching button SB. Instead, when the input source switching button SB is pushed, the input source may be switched directly to the document camera. That is, when the input source switching instruction signal is received from the document camera, the projector detects the document camera as the input source to be displayed and displays the image data from the document camera. In the course of detecting the document camera, the projector preferably displays the input source detecting picture ST shown in FIG. 7 on the screen.

(3) In the above-mentioned embodiment, the document camera 50 outputs the input source switching instruction when the input source switching button SB is pushed by the user. Instead, the input source switching instruction signal may be output when the arm 56 of the document camera 50 is unfolded. That is, a switch as an arm unfolding sensor sensing that the arm 56 is unfolded may be disposed in the document camera 50 and the input source switching instruction signal may be output when the switch senses the unfolding. According to this configuration, when the user takes an image using the document camera 50, it is possible to output the input source switching instruction signal to the projector 10 simply by unfolding the arm 56 holding the camera head 58. Accordingly, the operability is more excellent. The time when the document camera 50 outputs the input source switching instruction signal is not limited to the above-mentioned two times, but may be the time when another switch is operated by the user. Without being limited to the switch which is turned on in response to the user operation, the input source switching instruction signal may be output when a predetermined condition is satisfied.

(4) Although it has been described in the above-mentioned embodiment that the projector 10 and the document camera 50 are connected to each other by a USB cable, they may be connected by another wire such as a LAN. Not limited to the wired connection, a wireless connection using a USB or a LAN may be employed.

(5) Although it has been described in the above-mentioned embodiment that the document camera 50 is used as the image signal supply apparatus, another image signal supply apparatus such as a web camera, a digital still camera, and a video camera having an imaging unit may be employed.

(6) Although the projector 10 including the transmissive liquid crystal panels as the light modulators 344 has been exemplified as the image display apparatus in the above-mentioned embodiment, a reflective liquid crystal panel or a micro mirror device may be employed as the light modulators 344. Although it has been described in the above-mentioned embodiment that the projector 10 employing three light modulators 344 is employed, the number of light modulators 344 is not limited to three. For example, a rotating color wheel may be disposed in the lighting optical system 341 and the color light beams may be generated in a time divisional manner using a single light modulator 344. Four or more light modulators 344 may be employed.

(7) Although the projector 10 projecting an image on an external screen SC is used as the image display apparatus in the above-mentioned embodiment, a projection television including a screen and a projector projecting an image to the back surface of the screen may be employed instead. Without being limited to the projector, various image display apparatuses such as various direct-viewing flat panel display apparatuses may be employed.

(8) Some elements embodied by hardware in the above-mentioned embodiment may be replaced with software. On the contrary, some elements embodied by software may be replaced with hardware.

What is claimed is:

1. An image signal supply system, including:
a first image signal supply apparatus,
a second image signal supply apparatus, and
an image display apparatus, each of the first image signal supply apparatus and the second image signal supply apparatus outputting an image signal as an input source to the image display apparatus,
the first image signal supply apparatus comprising:
a communication unit carrying out communication with the image display apparatus; and
a switching instruction output unit outputting an instruction signal instructing the image display apparatus to switch the input source between the first image signal supply apparatus and the second image signal supply apparatus via the communication unit,
the image display apparatus including an input source switching unit disposed on the image display apparatus, the input source switching unit of the image display apparatus being configured to receive the instruction signal from the first image signal supply apparatus, the instructing signal instructing to switch the input source between the first image signal supply apparatus and the second image signal supply apparatus, and
each image signal supply apparatus being capable of connecting to the image display apparatus and capable of disconnecting from the image display apparatus.

2. The image signal supply system according to claim 1, the first image signal supply apparatus of the image signal supply system further comprising an imaging unit imaging an image of a subject.

3. The image signal supply system according to claim 1, the first image signal supply apparatus of the image signal supply system further comprising a switch receiving a predetermined operation,
  wherein the switching instruction output unit outputs the instruction signal on the basis of the predetermined operation performed on the switch.

4. The image signal supply system according to claim 2, the first image signal supply apparatus of the image signal supply system further comprising:
  a foldable arm holding the imaging unit; and
  an arm unfolding sensor sensing that the foldable arm is unfolded,
  wherein the switching instruction output unit outputs the instruction signal when the arm unfolding sensor senses that the foldable arm is unfolded.

5. The image signal supply system according to claim 1, wherein the communication unit carries out communication conforming to a USB standard.

6. An image display apparatus that is configured to display an image and is configured to be connected to at least a first image signal supply apparatus and a second image signal supply apparatus, the image display apparatus comprising:
  a communication unit configured to carry out communication with the first and second image signal supply apparatuses;
  an input source switching unit switching an input source, the input source switching unit disposed on the image display apparatus; and
  a switching controller activating the input source switching unit when an instruction signal for instructing to switch the input source between the first image signal supply apparatus and the second image signal supply apparatus is received from the first image signal supply apparatus via the communication unit,
  the input source switching unit of the image display apparatus being configured to receive the instruction signal from the first image signal supply apparatus, the instructing signal instructing to switch the input source between the first image signal supply apparatus and the second image signal supply apparatus, and
  image display apparatus being capable of connecting to each image supply apparatus and capable of disconnecting from each image supply apparatus.

7. The image display apparatus according to claim 6, wherein the image display apparatus is a projector comprising:
  a light source;
  a light modulator modulating light emitted from the light source into image light on the basis of an image signal supplied from the first image signal supply apparatus or the second image signal supply apparatus; and
  a projection lens projecting the image light.

8. A control method of an image signal supply system, including at least a first image signal supply apparatus and a second image signal supply apparatus, each of the first image signal supply apparatus and the second image signal supply apparatus outputting an image signal as an input source to the image display apparatus, the image display apparatus including an input source switching unit switching the input source, the input source switching unit being disposed on the image display apparatus, the control method comprising:
  establishing a connection between the image display apparatus and the first image signal supply apparatus and between the image display apparatus and the second image signal supply apparatus;
  outputting an instruction signal instructing to the image display apparatus to switch the input source between the first image signal supply apparatus and the second image signal supply apparatus via the communication unit, the step being performed by the first image signal supply apparatus, and
  receiving the instruction signal from the first image signal supply apparatus, the instructing signal instructing to switch the input source between the first image signal supply apparatus and the second image signal supply apparatus, the step being performed by the display apparatus,
  each image signal supply apparatus being capable of connecting to the image display apparatus and capable of disconnecting from the image display apparatus.

9. The control method according to claim 8, further comprising preparing an imaging unit for imaging an image of a subject.

10. The control method according to claim 8, further comprising:
  preparing a switch for receiving a predetermined operation; and
  outputting the instruction signal on the basis of the predetermined operation received by the switch.

11. The control method according to claim 9, further comprising:
  preparing a foldable arm for holding the imaging unit;
  preparing an arm unfolding sensor for sensing that the foldable arm is unfolded; and
  outputting the instruction signal when the arm unfolding sensor senses that the foldable arm is unfolded.

12. An image signal supply apparatus which is configured to output an image signal as an input source to an image display apparatus, the image display apparatus being connectable to the image signal supply apparatus and another image signal supply apparatus and including an input source switching unit that is disposed on the image display apparatus, the image signal supply apparatus comprising:
  a communication unit configured to carry out communication with the image display apparatus; and
  a switching instruction output unit outputting an instruction signal to the image display apparatus via the communication unit, the instruction signal instructing to switch the input source between the image signal supply apparatus and the other image signal supply apparatus,
  the instruction signal output from the image signal supply apparatus being configured to be received by the input source switching unit of the image display apparatus, the instructing signal instructing to switch the input source between the image signal supply apparatus and the other image supply apparatus,
  each image signal supply apparatus being capable of connecting to the image display apparatus and capable of disconnecting from the image display apparatus.

13. The image signal supply apparatus according to claim 12, further comprising an imaging unit imaging an image of a subject.

14. The image signal supply apparatus according to claim 12, further comprising a switch receiving a predetermined operation,
  wherein the switching instruction output unit outputs the instruction signal on the basis of the predetermined operation performed on the switch.

15. The image signal supply apparatus according to claim 13, further comprising:
  a foldable arm holding the imaging unit; and an arm unfolding sensor sensing that the foldable arm is unfolded,
wherein the switching instruction output unit outputs the instruction signal when the arm unfolding sensor senses that the foldable arm is unfolded.

16. The image signal supply system according to claim 1, each image signal supply apparatus being covered with a different housing from the image display apparatus.

17. The image display apparatus according to claim 6, the image display apparatus being covered with a different housing from each image supply apparatus.

18. The control method according to claim 8, each image signal supply apparatus being covered with a different housing from the image display apparatus.

19. The image signal supply apparatus according to claim 12, each image signal supply apparatus being covered with a different housing from the image display apparatus.

* * * * *